Figure 1:
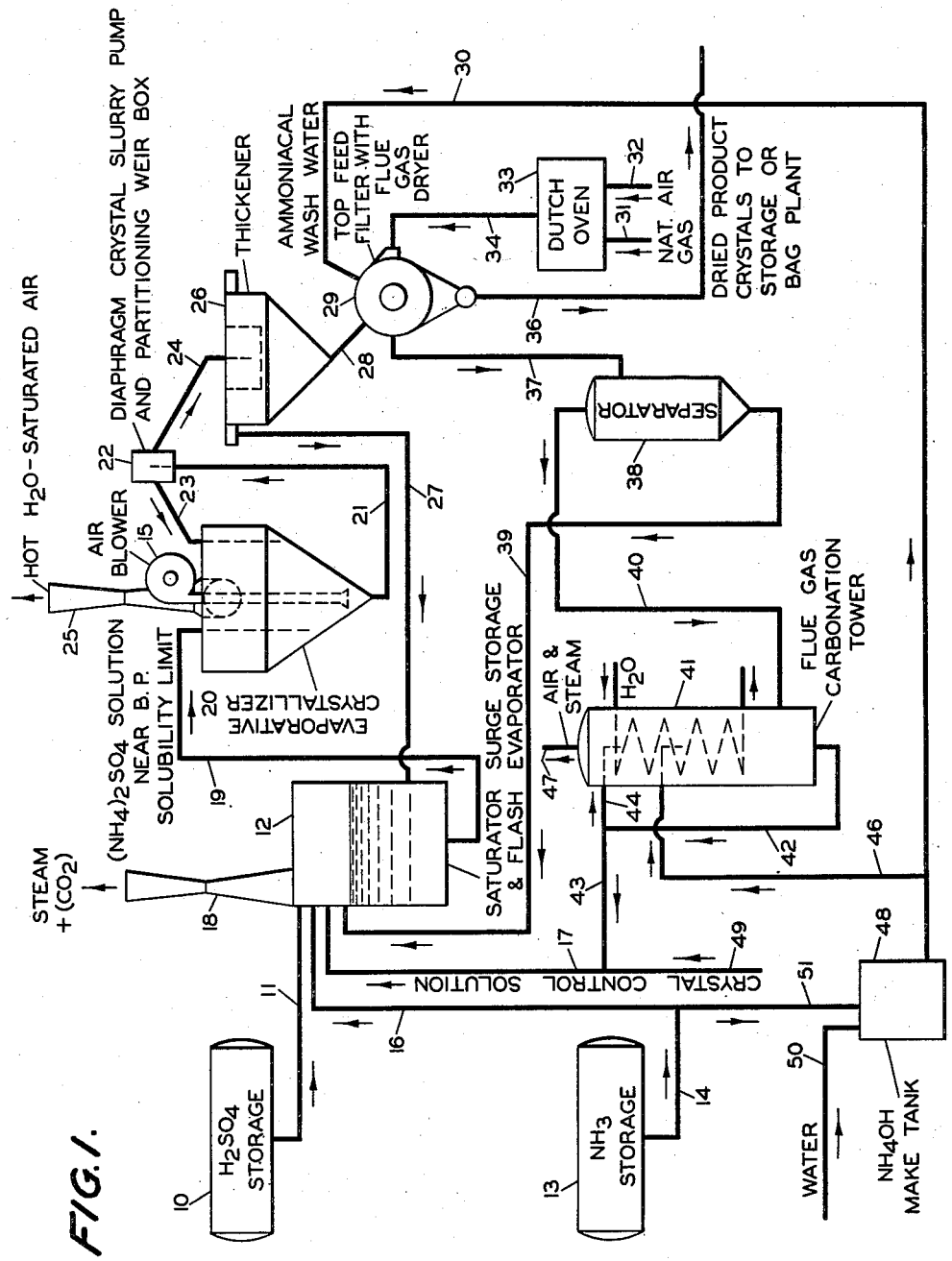

July 25, 1950      S. P. ROBINSON      2,516,420
PROCESS FOR THE MANUFACTURE OF IMPROVED
AMMONIUM SULFATE CRYSTALS
Filed Jan. 4, 1949      2 Sheets-Sheet 2

INVENTOR.
S.P. ROBINSON

ATTORNEYS

Patented July 25, 1950

2,516,420

UNITED STATES PATENT OFFICE 2,516,420

PROCESS FOR THE MANUFACTURE OF IMPROVED AMMONIUM SULFATE CRYSTALS

Sam P. Robinson, Bartlesville, Okla., assignor to Phillips Petroleum Company, a corporation of Delaware Application January 4, 1949, Serial No. 69,196

8 Claims. (Cl. 23—300)

This invention relates to the manufacture of ammonium sulfate. In one of its more specific aspects it relates to a process for the manufacture of large ammonium sulfate crystals of substantial growth along all three major crystallographic axes. In a specific embodiment this invention pertains to the manufacture of ammonium sulfate crystals having a bulk density as high as 75 pounds per cubic foot and of a short stubby shape.

There are many processes for the manufacture of ammonium sulfate, most of which are variations of two particular processes. The first of these is the direct reaction of ammonia or ammonia-containing gas with sulfuric acid or solutions containing same, thereby giving ammonium sulfate as product, and the second is the gypsum process wherein calcium sulfate is reacted with ammonium carbonate to give a product of ammonium sulfate and a by-product of calcium carbonate. Each of the ammonium sulfate products of these processes is recovered as an aqueous solution and must be concentrated and evaporated to remove the water and allow the ammonium sulfate to crystallize.

There are a great many methods for treating the aqueous ammonium sulfate solution to obtain crystals; however, most of the crystal products from such processes are of a long needle-like character which has a great many disadvantages when it comes to storing and using same as a fertilizer. There are also other crystal forms which have been disclosed such as thin plate-like crystals, oblong crystals, and long crystals, the ends of which are of a pyramidal shape. Most of these crystalline forms of ammonium sulfate are disadvantageous in one respect or another. A particular disadvantage which is encountered with almost all of them is that of caking and bridging on storage. Another is a relatively low bulk density requiring large packaging units. Others of these crystals, particularly the plate-like crystals, are susceptible to cementing together on prolonged contact.

An object of this invention is to provide an improved process for the manufacture of ammonium sulfate.

Another object of this invention is to provide an improved process for the manufacture of crystalline ammonium sulfate.

Still another object is to provide a process for the manufacture of crystalline ammonium sulfate which will not bridge or cake or become cemented together during prolonged storage.

Another object of this invention is to provide a process for the manufacture of crystalline ammonium sulfate wherein the growth of the crystals takes place along all three of the major crystallographic axes.

Still another object is to produce an ammonium sulfate crystal of high bulk density.

Other objects and advantages of this invention will be apparent to one skilled in the art from the accompanying disclosure and discussion.

I have discovered an improved process for the manufacture of crystalline ammonium sulfate whereby certain additives are introduced to an aqueous ammonium sulfate solution, such as that produced by the gypsum process or by the direct neutralization of ammonia with sulfuric acid, prior to crystallization to provide substantial growth along the three major crystallographic axes of the orthorhombic system, and whereby such growth is further promoted by an evaporative crystallization procedure of the type disclosed in my copending application, Serial No. 69,197, filed January 4, 1949.

In accordance with my invention, ammonium bicarbonate, ammonium carbonate, ammonium carbamate, or ammonium carbamate acid carbonate, or a mixture of any two or more thereof, is added to an ammonium sulfate liquor, that is, an aqueous solution of ammonium sulfate, in such quantities that when this solution is fed to an evaporative crystallizer the feed will preferably contain from 0.1 to 5.0 weight per cent of the additive based on dissolved ammonium sulfate. The use of these additives provides substantial growth along the three major crystallographic axes. By using thus prepared seed crystals to relieve supersaturation of an ammonium sulfate solution containing the above mentioned additives, large uniform crystals of a size in excess of +10 mesh as measured by the U. S. Tyler Standard Screen and of the same shape as the seed crystals can easily be obtained under proper conditions. It is not definitely known just how the additives control the crystal shape, however, it is thought that they may enter the crystal lattice of the ammonium sulfate and in some manner influence the crystal formation. The crystals produced are stubby and have a much smaller difference in growth along the three crystallographic axes than any crystals heretofore produced. In most cases the ratio of length to breadth or thickness is less than 2:1.

Crystals of the shape disclosed above are of prime importance because they reduce the size and cost of filtering, drying, handling, and packaging equipment. They further reduce package size because of their high bulk density and thus substantially reduce the over-all cost of handling. The crystals of my invention may also be washed and dried more efficiently and will cake and bridge much less when stored.

Figure 2:
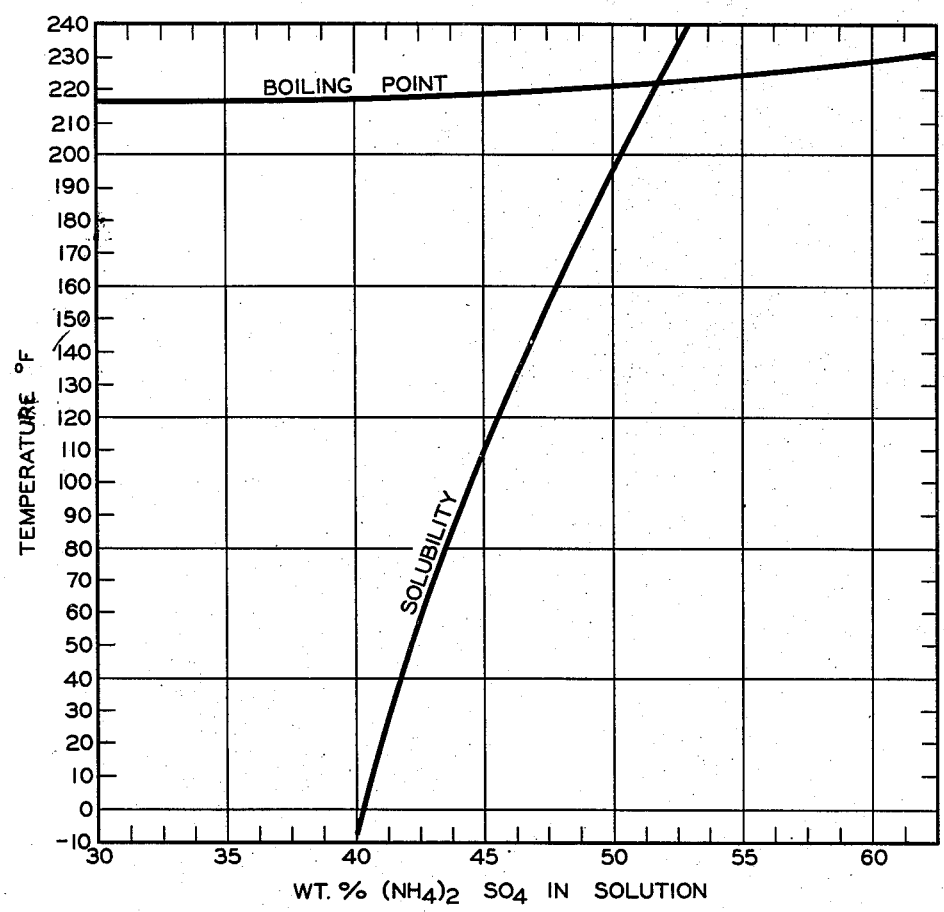

A further understanding of some of the many aspects of my invention may be had by referring to Figures 1 and 2. Figure 1 is a schematic flow diagram of a preferred embodiment of my invention. Various additional valves, pumps, and other conventional equipment will be familiar to one skilled in the art and have been omitted from this drawing for the sake of clarity. The following description of the drawing provides one method of operating my process; however, it is understood that while this is representative in general of my process, various minor changes may be made in adapting the process to the various conditions within the scope of the invention. Figure 2 is a chart showing the boiling point saturation limit of an aqueous ammonium sulfate solution.

The boiling point saturation limit, which phrase is used in this specification, refers to the temperature at which an aqueous salt solution boils when it will no longer dissolve more of the salt without the formation of crystals. At any particular pressure this temperature is fixed for a particular salt. Attached Figure 2 is a chart showing the boiling point saturation limit of ammonium sulfate in an aqueous solution at atmospheric pressure.

Refer now to Figure 1. Sulfuric acid from storage unit 10 is passed via line 11 to zone 12 which is a composite unit acting as a saturator, surge tank, and flash evaporator. Liquid ammonia from storage unit 13 is also passed to zone 12 via lines 14 and 16 where it reacts with the sulfuric acid directly to form ammonium sulfate. It is desirable that zone 12 have a relatively large volume compared to the volume of ammonia and sulfuric acid feed to insure a stable feed to the subsequent crystallization step hereinafter described, and to prevent any local excess of sulfuric acid which might reduce the solubility of ammonium sulfate in the solution enough to throw out seed crystals. The proportions of the principal reactants in this embodiment of my invention are controlled by a pH recorder-regulator, not shown, which is actuated by the liquor in zone 12.

An aqueous solution of my crystal growth controlling material such as ammonium carbonate, ammonium bicarbonate, ammonium carbamate, or ammonium carbamate acid carbonate, or a mixture thereof is introduced to zone 12 via line 17. Such additives are introduced in such quantities that from 0.1 to 5.0 weight per cent based on dissolved ammonium sulfate is present in the feed solution to the crystallization zone hereinafter described.

The direct reaction of sulfuric acid with ammonia would give a dry ammonium sulfate, however, there is usually some water in commercial sulfuric acid which may be used in my process. This water and additional water from the recycle mother liquor and crystal growth control solution are sufficient to provide an aqueous solution of ammonium sulfate within zone 12. The exothermic heat of reaction is sufficient to remove some of the water in the form of steam from the ammonium sulfate solution along with some carbon dioxide from the decomposition of the crystal growth control material. The steam and carbon dioxide are vented from zone 12 by any suitable means such as stack 18.

A sufficient quantity of acid is added to the solution in zone 12 to maintain a pH below 7.0 and preferably in the range of 5.0 to 5.5. If any ammonium sulfate solution is boiled for a time, the pH of the solution will come to an equilibrium at about 6.0, so only sufficient acid will be necessary to lower this to the preferred range.

The ammonium sulfate solution which is maintained near its boiling point saturation limit, that is, between 25 and 1° F. and preferably between 5 and 1° F. below the boiling point saturation limit, in zone 12 is passed via line 19 to evaporative crystallization zone 20. This evaporative crystallizer is the same as that disclosed and claimed in my copending application Serial No. 69,197, filed January 4, 1949. The ammonium sulfate solution at a pH in the range of 5.0 to 5.5 is concentrated and cooled to a temperature in the range of 140 to 160° F., and preferably in the range of 145 to 150° F. by blowing air or other inert gas which will remove moisture through it, for example, by means of blower 15. In this manner crystallization is initiated, the solution is maintained in a high state of agitation, and the crystals which are formed are classified so that only the large crystals are removed from the crystallizer. The hot, water-saturated air is removed from the crystallizer by any suitable means such as stack 25.

When first starting to operate my process all of the crystals removed from the crystallizer via line 21 and passed to diaphragm crystal slurry pump and partitioning weir box 22 are recycled to the crystallizer via line 23. When the crystals have reached a desired size, as may be determined by visual inspection at the weir box, a portion of them is removed from pump and weir box 22 via line 24 to thickener 26, which may be of any conventional design. The crystal size is controlled by the recycle ratio of crystals which is preferably in a range of 1:1 to 5:1 based on crystals passed to the thickener. By recycling the crystals, rapid crystal growth is obtained by contacting them with the ammonium sulfate solution which is more saturated above the bottom of the crystallizer. The crystals are recycled a number of times to obtain the desired size, rather than letting them remain in the bottom of the crystallizer and removed more slowly, to prevent clogging and blocking of the outlet from the crystallizer.

The crystal slurry from pump and weir box 22, which slurry is called a magma by those skilled in the art, has excess liquid removed therefrom in the thickener so that the dryer hereinafter described will not have to be of such a large size. The ammonium sulfate liquor removed from the crystals in the thickener is passed via line 27 back to zone 12 where it is reconcentrated. Crystals still containing some moisture are removed from thickener 26 via line 28 to top feed filter 29 which has a flue gas dryer. In the filter-dryer the crystals are treated with ammoniacal wash water containing 0.5 to 2 weight per cent ammonium hydroxide introduced via line 30 before drying to neutralize any residual acid. Other types of dryers may be used in my process and therefore the process of my invention is not to be limited by the particular type selected. Following the ammoniacal wash, the crystals are dried with air tempered combustion products. These products are made by burning natural gas and air introduced via lines 31 and 32 in dutch oven 33, however, any other source of hot gases is satisfactory. The hot gases are passed from dutch oven 33 via line 34 to filter-dryer 29. The dried product is removed from filter-dryer 29 via line 36 and is taken to storage, bagging plant, etc. There is no need for screening the product crystals because of close control of uniformity and hydraulic classification in the bottom of the cone of the evaporative crystallizer 20.

Air, flue gas, mother liquor, and some wash liquor are passed from filter-dryer 29 via line 37 to separator 38 where the gases are separated from the liquids. The mother liquor and wash water are passed via line 39 to zone 12. The gases from separator 38, which contain $CO_2$, are passed via line 40 to flue gas carbonation tower 41 which may be cooled by water or other coolant. In the carbonation tower the gases are contacted with ammonium hydroxide introduced via line 46 to form the small amount of ammonium carbonate and/or ammonium bicarbonate required for controlling the crystal growth in evaporative crystallizer 20. The product from the tower is removed via line 42. A portion or all of it may be passed via lines 43 and 17 to zone 12. If not all of the carbonate is passed to zone 12, the remaining portion may be passed via line 44 back through the carbonation tower. Exhaust gas from the tower is removed via line 47. Other compounds for controlling the crystal growth may be introduced to zone 12 via lines 49 and 17. When these materials are used, the carbonation step is bypassed or eliminated.

Ammonium hydroxide for use in the carbonation tower and the filter-dryer is made in zone 48 by introducing water thereto via line 50 and ammonia via lines 14 and 51.

My invention is not to be limited in its broadest aspects by the above described process which is merely one preferred embodiment of the invention. My invention may also be utilized to treat ammonium sulfate made by any other process such as the gypsum process. When this is done the ammonium sulfate liquor to which the crystal growth control material has been added should be brought close to its boiling point saturation limit in zone 12 which may be done by any of several conventional methods such as applying external heat to cause removal of water or by applying internal heat for the same purpose. Further, the pH of the solution should be maintained within the desired range which is partially done by boiling and which may be further accomplished by the addition of small quantities of sulfuric acid.

Further, the crystal growth control material may be supplied from any source. The ammonium carbonate and/or bicarbonate is produced in the embodiment described by the drawing and the discussion thereof to further improve the economics of the process.

Refer now to Figure 2, which is a chart showing the boiling point saturation limit of an aqueous ammonium sulfate solution. The abscissa indicates the weight per cent of ammonium sulfate dissolved in the water. The ordinate indicates temperature. As more ammonium sulfate is added to the solution, the boiling point is raised. The point at which the two curves cross indicates the maximum quantity of ammonium sulfate which may be dissolved at atmospheric pressure and the temperature at which the solution boils. In other words, no more ammonium sulfate may be dissolved in the solution without crystal formation, and the boiling point temperature will not go any higher.

In this application the term "an ammonium carbonate" is meant to include either ammonium carbonate, $(NH_4)_2CO_3$, or ammonium bicarbonate, $NH_4HCO_3$.

Advantages of this invention are illustrated by the following example. The reactants and their proportions are presented as being typical and should not be construed to limit the invention unduly.

*Example*

An ammonium sulfate solution with a pH of 5.5 is produced by the direct neutralization of ammonia with sulfuric acid. To this is added 0.75 weight percent of ammonium bicarbonate based on the dissolved ammonium sulfate. The thus prepared ammonium sulfate, at a temperature within 5° F. of its boiling point saturation limit, is fed to an evaporative crystallizer like that disclosed in my copending application, Serial No. 69,197, filed January 4, 1949, and shown in Figure 1 as described above. The seed crystals from the initial crystallization which are formed when water is removed from the ammonium sulfate are of a short stubby shape in which crystal growth is substantial along all three of the major crystallographic axes. These crystals are recycled to contact the ammonium sulfate solution for further crystal growth until their size is within the range desired. The crystals are then bled off continuously, washed, and dried.

Advantages of my invention include a rapid and economical method for making crystalline ammonium sulfate, and the manufacture of a crystal of desired size having a small difference in length, breadth, and thickness, thus giving a high bulk density, and which will not cake or bridge on storage and which will feed well through distributing apparatus.

Although this process has been described and exemplified in terms of its preferred modifications, it is understood that various changes may be made without departing from the spirit and scope of the disclosure and of the claims.

I claim:

1. An improved process for the manufacture of crystalline ammonium sulfate which comprises introducing a crystal growth control material selected from the group of ammonium carbonate, ammonium bicarbonate, ammonium carbamate, ammonium carbamate acid carbonate, and mixtures thereof to an aqueous solution of ammonium sulfate in an amount not to exceed 5 weight per cent of dissolved ammonium sulfate, evaporating said solution to a point near its saturation limit, and further evaporating and cooling said solution by the passage of an inert gas therethrough and thereby causing ammonium sulfate crystals to form.

2. An improved process for the manufacture of crystalline ammonium sulfate which comprises admixing an aqueous solution of a crystal growth control material selected from the group consisting of ammonium carbonate, ammonium bicarbonate, ammonium carbamate, ammonium carbamate acid carbonate, and mixtures thereof with an aqueous solution of ammonium sulfate an amount not to exceed 5 weight per cent of dissolved ammonium sulfate, introducing the admixture at a temperature within 25° F. of its boiling point saturation limit to an evaporation and crystallization zone, evaporating said admixture and cooling same to a temperature in the range of 140 to 160° F. by the passage of a cool inert gas therethrough, and thereby causing ammonium sulfate crystals to form.

3. An improved process for the manufacture of crystalline ammonium sulfate which comprises subjecting an ammonium sulfate aqueous solution near its boiling point saturation limit containing 0.1 to 5.0 weight per cent of a crystal growth control material selected from the group consisting of ammonium carbonate, ammonium bicarbonate, ammonium carbamate, ammonium carbamate acid carbonate, and mixtures thereof based on dissolved ammonium sulfate to evaporative crystallization, introducing the ammonium sulfate solution at a temperature within 5° F. of its boiling point saturation limit to an evaporation and crystallization zone, evaporating said admixture and cooling same to a temperature in the range of 145 to 150° F. by the passage of a cool inert gas therethrough, thereby causing short stubby ammonium sulfate crystals of high bulk density to be formed, and recovering said crystals as a product of the process.

4. An improved process for the manufacture of crystalline ammonium sulfate which comprises admixing an aqueous solution of a crystal growth control material selected from the group consisting of ammonium carbonate, ammonium bicarbonate, ammonium carbamate, ammonium carbamate acid carbonate, and mixtures thereof with an aqueous solution of ammonium sulfate in a quantity in the range of 0.1 to 5.0 weight per cent based on dissolved ammonium sulfate, evaporating said solution to a point near its saturation limit, agitating said admixture and evaporating and cooling same by the passage of a cool inert gas therethrough thus causing crystal formation, and classification of thus formed crystals, removing a crystal magma from said evaporative crystallization zone to a partitioning zone, recycling a portion of said magma to the evaporative crystallization zone, passing another portion of the magma to a thickening zone, removing excess mother liquor from said crystals and passing same back to said evaporative crystallization zone, washing and drying the crystals separated from the mother liquor and recovering same as a product of the process.

5. An improved process for the manufacture of crystalline ammonium sulfate of especially desirable size and shape which comprises admixing an aqueous solution of at least one ammonium carbonate as a crystal growth control material with an aqueous solution of ammonium sulfate in a quantity not to exceed 5 weight per cent based on dissolved ammonium sulfate, introducing the admixture at a temperature below its boiling point saturation limit to an evaporative crystallization zone, agitating said admixture and evaporating and cooling same by the passage of air therethrough thus causing crystal formation and classification of thus formed crystals, removing a crystal magma from said evaporative crystallization zone to a partitioning zone, recycling a portion of said magma from said partitioning zone to the evaporative crystallization zone, passing another portion of the magma from said partitioning zone to a thickening zone, removing excess mother liquor from said crystals and passing same back to said evaporative crystallization zone, passing crystals from said thickening zone to a washing and drying zone, washing said crystals with ammoniacal wash water and drying same by contacting with hot gases, recovering said crystals as a product of the process, passing the ammoniacal wash water, mother liquor, and the hot drying gases which have been used to treat the ammonium sulfate crystals to a separation zone wherein the gas is separated from the liquid, passing said liquid back to said evaporative crystallization zone, and passing said gas to a carbonation zone wherein it is contacted with aqueous ammonium hydroxide thereby converting carbon dioxide in said gas to ammonium carbonate and ammonium bicarbonate to be admixed with the aqueous ammonium sulfate feed.

6. A process according to claim 5 wherein the ammonium sulfate solution fed to the evaporative crystallization zone contains said crystal growth control material in a quantity in the range of 0.1 to 5 weight per cent based on dissolved ammonium sulfate.

7. A process according to claim 5 wherein the ammonium sulfate solution is introduced to the evaporative crystallization zone at a temperature in the range of 1 to 25° F. below the boiling point saturation limit of said ammonium sulfate solution.

8. An improved process for the manufacture of crystalline ammonium sulfate of especially desirable size and shape, which comprises admixing an aqueous solution of at least one ammonium carbonate as a crystal growth control material with an aqueous solution of ammonium sulfate in a quantity in the range of 0.1 to 5 weight per cent based on the dissolved ammonium sulfate, introducing the admixture to an evaporative crystallization zone at a temperature in the range of 1 to 5° F. below the boiling point saturation limit of said ammonium sulfate solution, agitating said admixture and evaporating same and cooling same to a temperature in the range of 145 to 150° F. by the passage of air therethrough and thereby causing crystal formation and classification of thus formed crystals, removing ammonium sulfate crystal magma from said evaporative crystallization zone to a partitioning zone, passing a portion of said magma to a thickening zone, recycling the remaining portion of said magma to said evaporative crystallization zone in a ratio of 1 to 5 volumes per volume of magma passed to said thickening zone, removing excess mother liquor from said crystals and passing same back to said evaporative crystallization zone for further evaporating, passing crystals from said thickening zone to a washing and drying zone, washing said crystals with a 0.5 to 2 weight per cent solution of ammonium hydroxide, introducing natural gas and air to a combustion zone wherein they are burned, passing hot flue gas from said combustion zone to said drying zone and drying said washed crystals, recovering said dried crystals as a product of the process, passing the ammonium hydroxide wash solution, mother liquor and hot drying gases from said washing and drying zone to a separation zone wherein the gas is separated from the liquid, passing said liquid back to said evaporative crystallization zone, passing said gas to a carbonation zone, contacting said gas with aqueous ammonium hydroxide and thereby converting carbon dioxide in said gas to ammonium carbonate and ammonium bicarbonate, and admixing said ammonium carbonate and bicarbonate with said aqueous ammonium sulfate feed to said evaporative crystallization zone in the prescribed quantities as the crystal growth control material.

SAM P. ROBINSON.

REFERENCES CITED

The following references are of record in the file of this patent:

UNITED STATES PATENTS 1,870,131    Meier _____ Aug. 2, 1932